Sept. 26, 1939. O. H. DORER 2,174,153
AUTOMATIC CHECK VALVE
Filed Nov. 13, 1937 4 Sheets-Sheet 1

Oscar H. Dorer
INVENTOR
BY *Rolu Meyer*
ATTORNEY

Sept. 26, 1939.   O. H. DORER   2,174,153
AUTOMATIC CHECK VALVE
Filed Nov. 13, 1937   4 Sheets-Sheet 2

OSCAR H. DORER
INVENTOR

BY *Robt Meyer*
ATTORNEY

Sept. 26, 1939.  O. H. DORER  2,174,153
AUTOMATIC CHECK VALVE
Filed Nov. 13, 1937  4 Sheets-Sheet 3
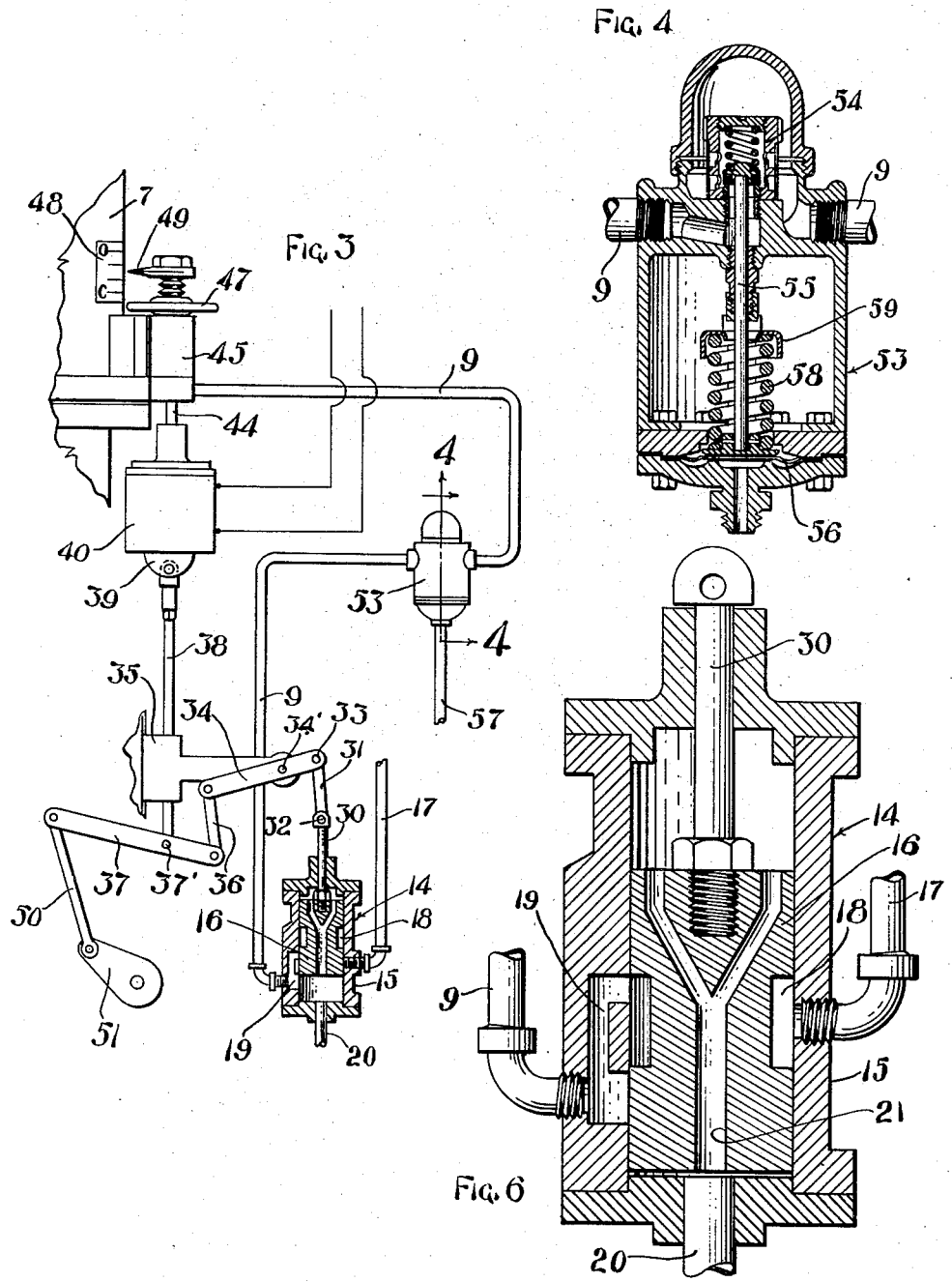
Oscar H. Dorer
INVENTOR
BY [signature]
ATTORNEY

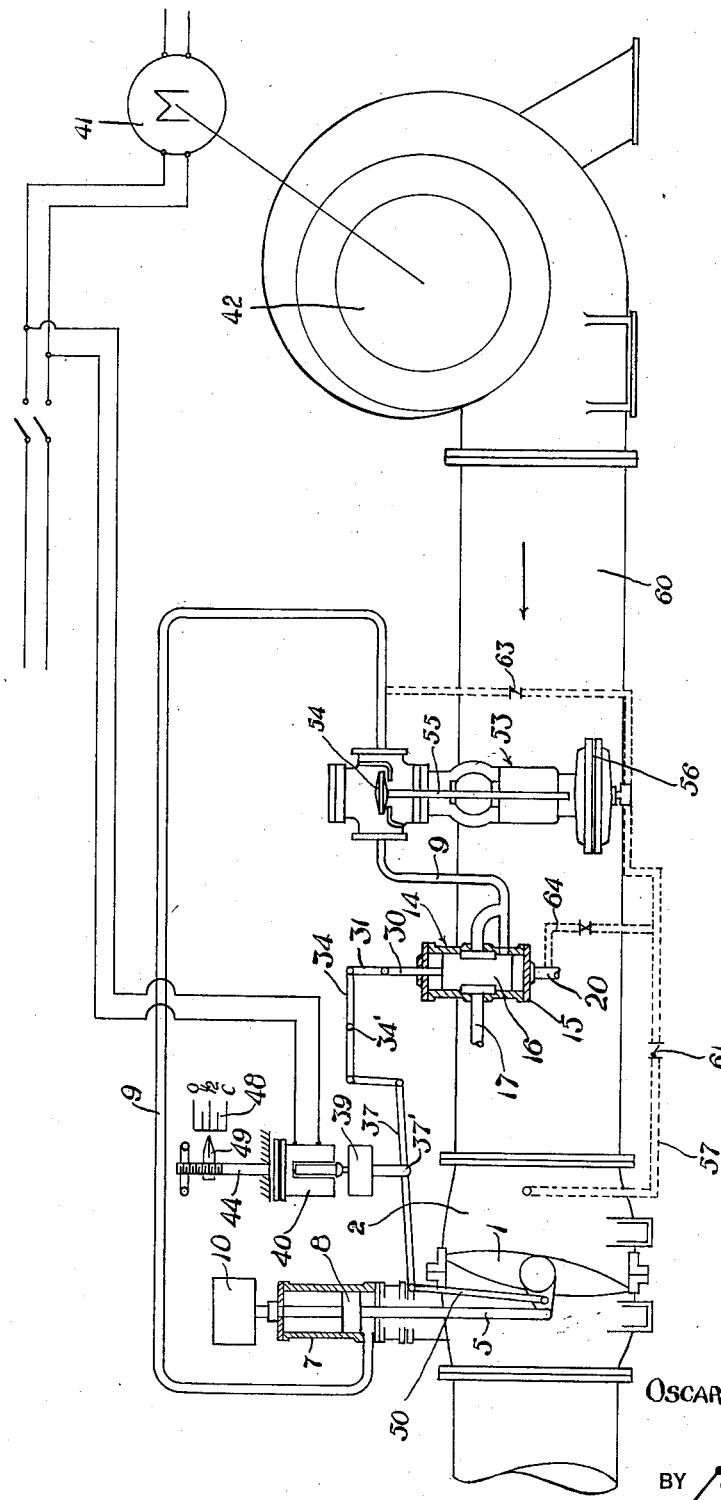

Patented Sept. 26, 1939

2,174,153

UNITED STATES PATENT OFFICE 2,174,153

AUTOMATIC CHECK VALVE

Oscar H. Dorer, East Orange, N. J., assignor to Worthington Pump and Machinery Corporation, Harrison, N. J., a corporation of Delaware Application November 13, 1937, Serial No. 174,357

16 Claims. (Cl. 103—40)

This invention relates to valves, and more particularly to large swingable or pivoted valves of the butterfly type such as are used in sewage systems or other conduits for controlling the flow of liquid therethrough.

An object of the present invention is to provide pressure operated means under control of the pressure of fluid flowing through the conduit for automatically opening the valve upon the building up of pressure on the pump or inlet side of the valve, and for permitting closing of the valve upon failure of pressure on the pump or inlet side of the valve to prevent back-flow through the valve and also to provide means for closing the valve upon the de-energizing of the operating motor of the pump in the system in which the valve is employed.

Another object of the present invention is to provide adjustable means which may be manually set for regulating the degree of opening or closing of the valve, which means acts upon and in a measure regulates the operation of the control means of the valve operating mechanism.

With these and other objects in view, as may appear from the accompanying specification, the invention consists of various features of construction and combination of parts, which will be first described in connection with the accompanying drawings, showing an automatic check valve embodying the invention, and the features forming the invention will be specifically pointed out in the claims.

In the drawings:

Figure 3 is a view partly in elevation and partly in section of the valve operating and control mechanism.

Figure 4 is a vertical section through a regulating control valve employed in the structure and taken on the line 4—4 of Figure 3.

Figure 6 is an enlarged vertical section through the pilot valve structure showing it in open position for operating the valve operating mechanism to open the valve.

Figure 7 is a diagrammatic view illustrating the system in which the valve is employed.

Figure 1:
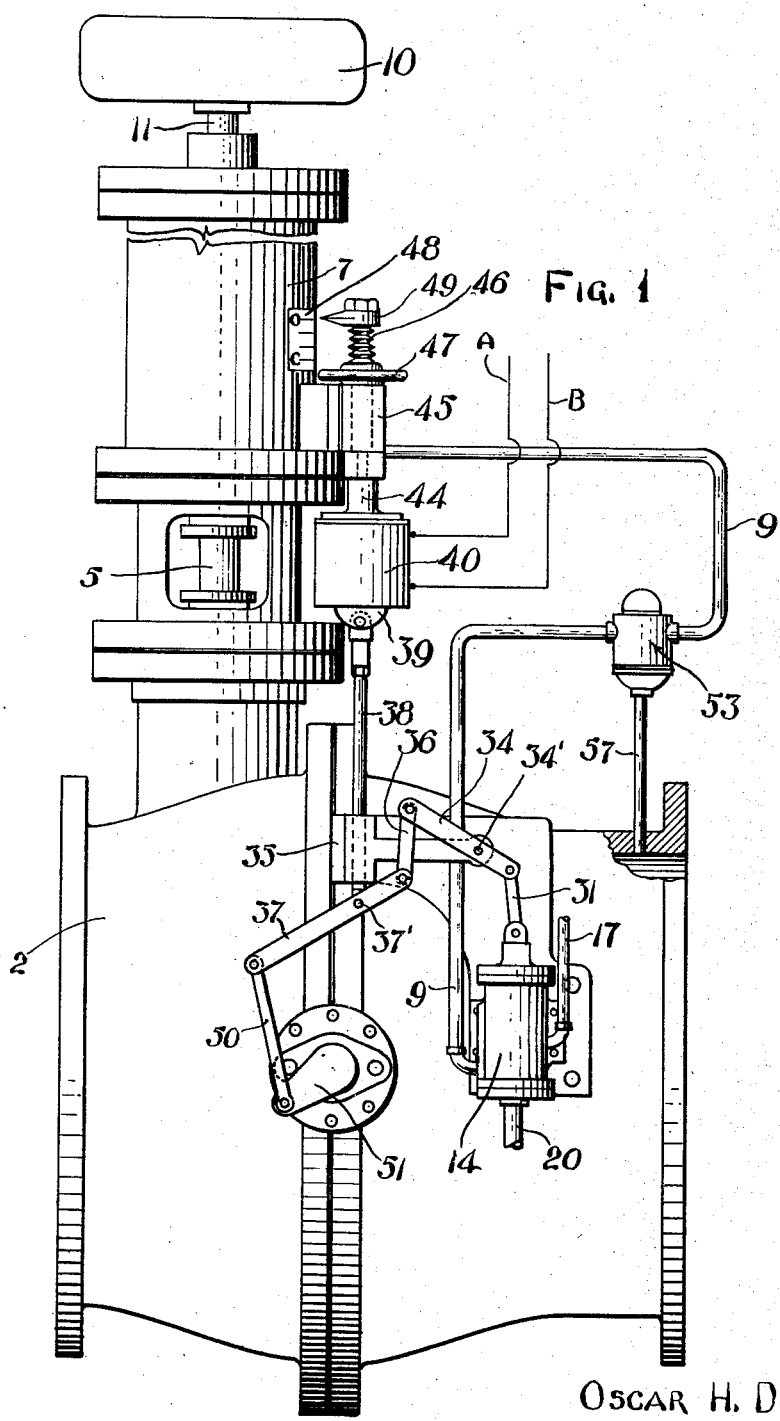
Figure 1 is a side elevation of the improved automatic check valve structure.
Figure 5:
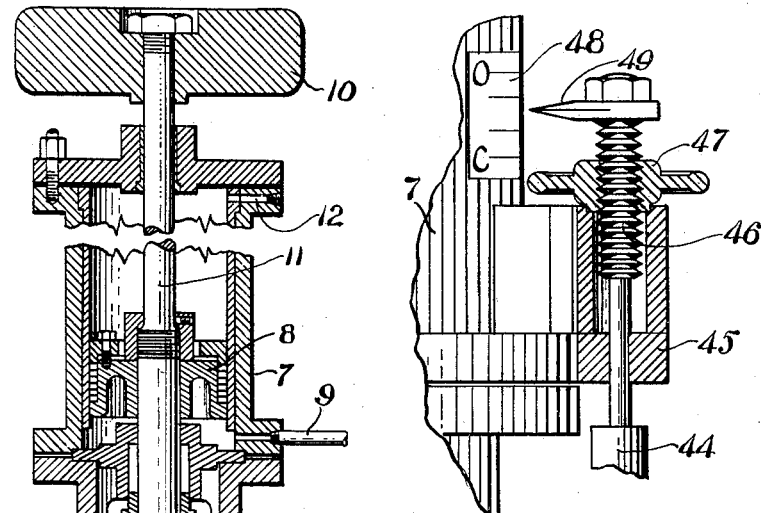
Figure 5 is an enlarged detail section of a part of the structure which controls the degree of opening of the valve.
Figure 2:
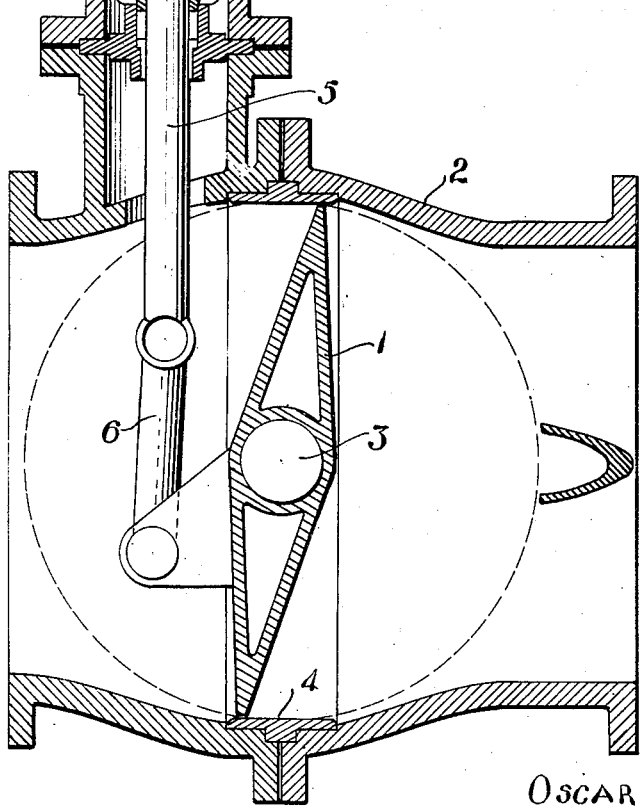
Figure 2 is a vertical section through the check valve structure.

Referring more particularly to the drawings, the pivoted or swingable valve member 1 swings in the valve housing 2 on its central axis 3 for opening or closing the passage through the housing. This valve is of the butterfly type, the circumference of the pivoted valve member 1 engaging the inner circumference of the seat 4 for cutting off the flow of fluid through the valve housing and consequently through the conduit with which the valve is employed. An operating piston rod 5 is connected to the valve element 1 by an articulated connection 6 and it extends upwardly into the cylinder 7. A piston 8 is mounted on the piston rod 5 and reciprocates in the cylinder 7, moving upwardly under pressure of a pressure fluid which enters the cylinder 7 through the pipe 9, to move the valve element 1 into open position. The piston 8, and piston rod 5 are moved downwardly, to move the valve element 1 into closed position under action of a weight 10 which is mounted upon an extension 11 of the piston rod 5, at such time or times when the pressure of the pressure fluid in the cylinder 7 beneath the piston 8 has been reduced a sufficient amount to permit the weight to act to force the piston 8 downwardly to move the valve element 1 into closing position.

A pressure relief valve 12 is provided in the upper end of the cylinder 7.

Pressure fluid is delivered to the cylinder 7 through the pipe 9 from any suitable source of pressure fluid (not shown) such as city water pressure when such is available and the delivery of such pressure fluid to the cylinder 7 is primarily controlled by a pilot valve structure 14. The pilot valve structure 14 includes a cylinder 15 in which a piston valve 16 is mounted. The cylinder 15 has connection with the source or supply of pressure fluid through the pipe 17 and when the piston 16 is in its downward position, as shown in Figure 6 of the drawings, the pressure fluid enters the annular channels 18 in the piston valve 16 and passes therefrom through the passage 19 in the cylinder 15 into and through the pipe 9. The cylinder 15 has a drain or exhaust connection 20 at the bottom thereof which opens into the cylinder so that when the piston 16 is in its upper position as shown in Figure 3 of the drawings connection is established between the passage 19 and the drain 20 to allow the pressure fluid to drain back through the pilot valve 14 for relieving the pressure in the cylinder 7 to permit the weight 10 to move the valve element 1 into closed position. The upward movement of the piston valve 16 cuts off communication between the supply inlet 17 and the annular channel 18. The piston valve 16 is provided with a drainage opening 21 which opens out through the top of the piston valve to permit any pressure fluid which leaks past the valve into the top of the cylinder 15 to drain therefrom and out through the outlet drain 20.

A piston rod 30 is connected to the piston valve 16 and to a link 31. The link 31 which is pivotally connected as shown at 32 to the piston rod is also pivotally connected as shown at 33 to an arm 34. The arm 34 is in turn pivotally supported by a suitable supporting guiding bracket 35 and is connected by a link 36 to one end of a pivoted lever 37. The lever 37 is pivotally supported by a rod 38 which is connected to the core 39 of a solenoid 40. The solenoid 40 is of any approved construction and is connected as shown in the diagrammatic Figure 7 with the power line to the motor 41 which drives the pump 42 employed in the system in connection with the valve structure so that when the motor 41 is energized the solenoid 40 will be energized and when the motor is de-energized or the circuit is broken therethrough the solenoid 40 will be de-energized. The solenoid 40 is supported by a suitable supporting rod 44 which extends through a suitable support 45 and has its upper end threaded as shown at 46. An adjusting wheel 47 is mounted on the threaded portion of the rod 44 and by rotation of this wheel 47 the solenoid 40 is moved up or down to regulate the position of the pivoted lever 37 and consequently regulate the degree of opening or closing of the pivoted valve element 1 as will be hereinafter more fully described. A suitable graduated chart 48 is provided, with which a pointer 49 cooperates to permit regulated adjustment of the position of the solenoid 40 and consequently of the pivoted lever 37 for allowing accurate regulation of the degree of opening or closing of the valve member 1.

The end of the lever 37 remote to the end to which the link 36 is connected has a link 50 connected thereto which is in turn connected to an arm 51. The arm 51 is connected to the swinging valve element 1 for movement therewith, to move the piston valve 16 through the articulated connection formed of the levers 34 and 37 and the links 50, 36 and 31 so as to cut off the flow of pressure fluid to the cylinder 7 when the valve element 1 has reached the predetermined position depending upon the adjusted position of the solenoid 40, and consequently arrest further movement of the valve element.

An interrupter valve 53 is positioned in the supply line 9 which delivers the operating pressure fluid to the cylinder 7. The interrupter valve structure 53 comprises a movable valve element 54 which controls the passage of liquid through the interrupter valve structure. The valve element 54 has an operating rod 55 connected thereto which is in turn connected to the inner side of a diaphragm 56. The outer or under side of the diaphragm is subjected to action of pressure fluid on the pump or inlet side of the valve casing 2 through a suitable connection 57 which opens into the valve casing 2 as clearly shown in Figure 1 of the drawings. A spring 58 is also provided which engages the diaphragm 56 and a cap 59 carried by the valve rod 55 so that the tension of this spring 58 must be overcome by movement of the diaphragm before the valve 54 is operated by upward movement of the diaphragm and the spring acts to move the valve downwardly upon the relief of pressure against the diaphragm.

Operation of the improved automatic check valve is as follows:

Assuming that the pump 42 is in operation and has primed, the pressure generated through the discharge line of the pump indicated at 60, into the inlet or pump side of the valve casing 2 is approximately 12 pounds. This pressure acts through the line or pipe 57 connected to the diaphragm 56 of the interrupter valve 53 through a small check valve indicated at 61.

At such time the valve element 54 of the interrupter valve 53 is in closed position due to the spring 58 and water pressure from the supply inlet 17 is acting on the top of the valve 54. Pressure fluid or water reaches the top part of the interrupter valve 53 due to the energizing of the solenoid 40 upon the energizing of the motor 41 and the solenoid through the levers 37 and 34 and the links 36 and 31 moves the valve piston 16 into its lower position opening the supply of water pressure through the pilot valve 14.

The downward forces working on the valve element 54 of the interrupter valve 53 are the spring 58 plus the pressure of the pressure water times the area of the valve element 54. There is no pressure in the line 9 beyond the interrupter valve or between the interrupter valve and the cylinder 7. The pressure through the line 57 acting on the diaphragm 56 overcomes the downward forces and causes the valve element 54 to open. A flow of pressure water sufficient to fill up the line 9 between the interrupter valve 53 and the cylinder 7 causes a complete building up of pressure in this line in which case the valve element 54 is not of equilibrium and the forces holding it open are increased. As shown in the diagrammatic Figure 7, the line 57 is cross connected to the line 9 with a suitable small check valve indicated at 63, and bleed line to maintain higher pressure on the diaphragm so long as pressure is in the line 9 between the interrupter valve 53 and the cylinder 7. Due to the opposed check valves 61 and 63, a small orifice line 64 of lesser carrying capacity is provided to bleed pressure from the diaphragm during a later phase of the operations.

The pressure water from the supply 17 enters the cylinder 7 and acts in full measure on the piston 8 therein. The piston 8 is of such size that it lifts the weight 10, overcomes the frictional resistance of the valve element 1 and opens the valve element. During the opening of the valve element and the movement of the piston the levers 37 and 34 and the linkage connected thereto move about the fixed fulcrum 37' and 34' (the solenoid 40 being still energized) and lifts the piston valve 16 to the position as shown in Figure 3 which cuts off the supply of water pressure to the cylinder 7. The valve element 1 then stops moving and any tendency towards over travel of the valve element is counteracted because the water pressure supply line 9 between the pilot valve 14, and the interrupter valve 53 is then connected to the exhaust or drain 20 allowing exhaust of some pressure from the hydraulic cylinder 7. Only part of the pressure is relieved since the ports of the pilot valve structure 14 are in cracked open position.

If under travel should occur the valve piston 16 will be in the position shown in Figure 6 of the drawings except in a cracked open position. The ports which control the flow of the water pressure or pressure water through the pilot valve 14 are so arranged that cracked open position gives an exhaust that has just been closed and a cracking closing position equals a slightly open exhaust corresponding to supply port just closing a slight amount.

Therefore if the hand wheel 47 is adjusted so that the indicator points to one-half, as shown in the diagrammatic Figure 7 the valve element 1 does not open beyond the one-half position, or whatever other position is predetermined by the setting of the solenoid 40 and the lever 37 by adjustment of the hand wheel 47.

If the motor 41 is de-energized, the solenoid 40 is likewise de-energized and the weighted core 39 drops, dropping the fulcrum 37' and since 34' is a fixed fulcrum, the dropping of the fulcrum 37' will lift the piston valve 16 of the pilot valve 14 into its upper position and allow exhaust of pressure from the line 9. The exhaust of the pressure from the line 9 takes the pressure away from the top side of the valve element 54 and the pressure in the line 9 between the interrupter valve 53 and the cylinder 7 which reduces to ten pounds due to the action of the weight 10 keeps the valve 54 open, allowing the exhaust or bleeding of the pressure water in the line 9. The downward forces at the valve element 54 are the spring 58 while the upward forces are the area of the under side of the valve element times ten pounds per square inch plus the pressure in the line 47 which does not diminish below ten pounds per square inch even with the slowing down of the pump to zero. Pressure in the line 57 becomes zero as the pump stops but the check valves 61 and 63 cross connected to the line 9 beyond the interrupter valve 53 do not permit less than a ten pound pressure acting on the diaphragm 56 thus keeping the valve element open during closure period of the valve element 1. When the valve element 1 is completely closed the pressure in the lines 9 and 57 drops to zero and pressure below the diaphragm 56 vanishes due to leakage through the small orifice pipe 64.

If the hand wheel 47 is operated to set the indicator 49 at 0 or full open position the functions and operation of the various elements making up the automatic check valve are identical except that the valve element 1 moves until full open position is attained and the linkage arrangement is such that the pilot valve does not get back to a balanced position as described for the one-half opening. Instead full pressure of pressure water continues through the pilot valve and the line 9. The valve will be in full open position during the majority operating time for preventing floating of the valve element 1.

When the hand wheel is adjusted to set the indicator in position C or in closed position it does not permit the pilot valve 14 to open supply pressure to the cylinder 7 regardless of whether the solenoid 40 is energized or not.

If the pump 42 fails to prime during any starting cycle there is no appreciable pressure against the diaphragm 56 and consequently the interrupter valve 53 does not open, regardless of the action of the pilot valve 14 and consequently upon failure of the pump 42 to prime, the valve element 1 will remain in closing position.

It will be understood that the invention is not to be limited to the specific construction or arrangement of parts shown but that they may be widely modified within the invention defined by the claims.

What is claimed is:

1. The combination comprising a conduit having a movable valve element therein for controlling the fluid flow therethrough, means operated by pressure fluid for moving said valve element into its open position, means controlled by pressure of fluid in the conduit on the inlet side of the valve element for controlling flow of operating fluid to said pressure fluid operated means, and electrically operated means operating independently of said pressure controlled means for controlling delivery of operating fluid to said pressure controlled means.

2. The combination comprising a conduit having a movable valve element therein for controlling the fluid flow therethrough, means for moving said valve element, means controlled by pressure of fluid in the conduit on the inlet side of the valve element for initiating movement of the valve element, and adjustable means acting on said movement initiating means for regulating the degree of opening and closing of the valve element.

3. The combination comprising a conduit having a movable valve element therein for controlling the fluid flow therethrough, means operated by pressure fluid for moving said valve element into its open position, means controlled by pressure of fluid in the conduit on the inlet side of the valve element for controlling flow of operating fluid to said pressure fluid operated means, and electrically operated means operating independently of said pressure controlled means for controlling delivery of operating fluid to said pressure controlled means, and adjustable means for adjusting the position of said electrically operated means for controlling the degree of opening and closing of the valve element.

4. The combination comprising a conduit having a movable valve element therein for controlling the fluid flow therethrough, means operated by pressure fluid for moving said valve element into its open position, means controlled by pressure of fluid in the conduit on the inlet side of the valve element for controlling flow of operating fluid to said pressure fluid operated means, means for moving said valve element into closed position, said pressure fluid operated means for opening the valve acting to render said valve closing means inactive to close the valve, said movement initiating means acting upon failure of pressure fluid on the inlet side of the valve element to release said valve closing means from the action retarding effect of said valve opening means thereon to permit the valve closing means to move the valve element in closing movement, and adjustable means for regulating the degree of opening and closing of said valve element.

5. In a valve, the combination with a conduit, a pump for pumping fluid therethrough and an electric motor for operating the pump, of a movable valve element for controlling fluid flow through the conduit, pressure operated means for moving said valve element into open position, means for moving said valve element into closing position, electrically operated means actuated upon de-energizing of said motor for cutting off the delivery of operating fluid to said pressure operated means and permitting said valve element closing means to move the valve element into closing position, said electrically operated means operating upon the energizing of the motor to permit the flow of operating pressure fluid to the pressure operated means, and adjustable means for regulating the position of said electrically operated means to control the degree of opening or closing of the valve element.

6. In a valve, the combination with a conduit, a pump for pumping fluid therethrough and an electric motor for operating the pump, of a movable valve element for controlling fluid flow through the conduit, pressure operated means for moving said valve element into open position, means for moving said valve element into closing position, electrically operated means actuated upon de-energizing of said motor for cutting off the delivery of operating fluid to said pressure operated means and permitting said valve element closing means to move the valve element into closing position, and means actuated by pressure of fluid between the pump and valve element for controlling the flow of operating fluid to the pressure operated means independently of said electrically operated means, said electrically operated means operating upon energizing of the motor to permit the flow of operating pressure fluid to the pressure actuated controlling means.

7. In a valve, the combination with a conduit, a pump for pumping fluid therethrough and an electric motor for operating the pump, of a movable valve element for controlling fluid flow through the conduit, pressure operated means for moving said valve element into open position, means for moving said valve element into closing position, electrically operated means actuated upon de-energizing of said motor for cutting off the delivery of operating fluid to said pressure operated means and permitting said valve element closing means to move the valve element into closing position, and means actuated by pressure of fluid in the conduit between the pump and valve element for controlling the flow of operating fluid to said pressure operated means independently of said electrically operated means.

8. In a valve, the combination with a conduit, a pump for pumping fluid therethrough and an electric motor for operating the pump, of a movable valve element for controlling fluid flow through the conduit, pressure operated means for moving said valve element into open position, means for moving said valve element into closing position, electrically operated means actuated upon de-energizing of said motor for cutting off the delivery of operating fluid to said pressure operated means and permitting said valve element closing means to move the valve element into closing position, adjustable means for regulating the position of said electrically operated means to control the degree of opening or closing of the valve element, and means actuated by pressure of fluid in the conduit between the pump and valve elemtn for controlling the flow of operating fluid to said pressure operated means independently of said electrically operated means, said electrically operated means operating upon energizing of the motor to permit the flow of operating pressure fluid to the pressure actuated control means.

9. In a valve, the combination with a conduit, a pump for pumping fluid therethrough and an electric motor for operating the pump, of a movable valve element for controlling fluid flow through the conduit, pressure operated means for moving said valve element into open position, a pilot valve for controlling flow of operating fluid to said pressure operated means, electrically operated means under control of the current control of said motor for controlling operation of said pilot valve, and adjustable means for regulating the position of said electrically operated means to control the degree of opening or closing of the valve element.

10. In a valve, the combination with a conduit, a pump for pumping fluid therethrough and an electric motor for operating the pump, of a movable valve element for controlling fluid flow through the conduit, pressure operated means for moving said valve element into open position, a pilot valve for controlling flow of operating fluid to said pressure operated means, electrically operated means under control of the current control of said motor for controlling operation of said pilot valve, said pilot valve acting to supply operating fluid to said pressure operating means upon energizing of the motor to move the valve element into open position and to permit the bleeding of operating fluid from the pressure operated means upon de-energizing of the motor, means for moving the valve element into closing position upon the bleeding of pressure fluid from the pressure operated means, and adjustable means for regulating the position of said electrically operated means to control the degree of opening or closing of the valve element.

11. In a valve, the combination with a conduit, a pump for pumping fluid therethrough and an electric motor for operating the pump, of a movable valve element for controlling fluid flow through the conduit, pressure operated means for moving said valve element into open position, a pilot valve for controlling flow of operating fluid to said pressure operated means, electrically operated means under control of the current control of said motor for controlling operation of said pilot valve, and means actuated by pressure of fluid in the conduit between the pump and the valve element for controlling the flow of operating fluid to said pressure operated means independently of said pilot valve and electrically operated means.

12. The combination with a conduit, a pump for pumping fluid therethrough and an electric motor for operating the pump, of a movable valve element for controlling fluid flow through the conduit, pressure operated means for moving said valve element into open position, means actuated by pressure of fluid between the pump and the valve element for controlling the flow of operating fluid to the pressure operated means independently of said electrically operated means, a pilot valve for controlling flow of operating fluid to said pressure operated means, electrically operated means under control of the current control of said motor for controlling operation of said pilot valve, said pilot valve acting to supply operating fluid to said pressure operating means upon energizing of the motor to move the valve element into open position and cut off flow of pressure fluid to said pressure actuated means to permit the bleeding of operating fluid from the pressure operated means upon de-energizing of the motor, means for moving the valve element into closing position upon the bleeding of operating fluid from the pressure operated means upon de-energizing of the motor, and means for moving the valve element into closing position upon the bleeding of pressure fluid from the pressure operated means.

13. The combination with a conduit, a pump for pumping fluid therethrough and an electric motor for operating the pump, of a movable valve element for controlling fluid flow through the conduit, pressure operated means for moving said valve element into open position, means actuated by pressure of fluid between the pump and the valve element for controlling the flow of operating fluid to the pressure operated means independently of said electrically operated means, a pilot valve for controlling flow of operating fluid to said pressure actuated means, electrically operated means under control of the current control of said motor for controlling operation of said pilot valve, said pilot valve acting to supply operating fluid to and through said pressure actuated means to said pressure operating means upon energizing of the motor to move the valve element into open position and cut off flow of pressure fluid to said pressure actuated means to permit the bleeding of operating fluid from the pressure operated means upon de-energizing of the motor, means for moving the valve element into closing position upon the bleeding of pressure fluid from the pressure operated means, means actuated by pressure of fluid between the pump and the valve element for controlling the flow of operating fluid to the pressure operated means independently of said electrically operated means, and adjustable means for regulating the degree of opening and closing of the valve element.

14. The combination with a conduit, a pump for pumping fluid therethrough and an electric motor for operating the pump, of a movable valve element for controlling fluid flow through the conduit, a cylinder, a piston in said cylinder and connected to said valve element for moving the valve element in opening position upon movement of the piston in one direction, a pilot valve, said pilot valve acting to permit the flow of operating fluid to said cylinder to move the piston in valve opening movement, means operated upon the energizing of said motor for operating said pilot valve to permit the flow of operating fluid to said cylinder, said means operating said pilot valve upon de-energizing of the motor to permit operating fluid to bleed from said cylinder, and a weight for moving the valve element in closing position upon the bleeding of pressure fluid from the cylinder, and adjustable means for regulating the position of the means operated by the energizing or de-energizing of the motor to regulate the degree of opening and closing of the valve element.

15. The combination with a conduit, a pump for pumping fluid therethrough and an electric motor for operating the pump, of a movable valve element for controlling fluid flow through the conduit, a cylinder, a piston in said cylinder and connected to said valve element for moving the valve element in opening position upon movement of the piston in one direction, a pressure operated valve structure between said pilot valve and said cylinder and acted upon by pressure in the conduit between the pump and valve element to control the flow of operating fluid to the cylinder independently of the pilot valve, a pilot valve, said pilot valve acting to permit the flow of operating fluid to and through said pressure operated valve structure and to said cylinder to move the piston in valve opening movement, means operated upon the energizing of said motor for operating said pilot valve to permit the flow of operating fluid to said pressure operated valve, said means operating said pilot valve upon de-energizing of the motor to cut off flow of pressure fluid to said pressure operated valve and permit operating fluid to bleed from said cylinder, a weight for moving the valve element in closing position upon the bleeding of pressure fluid from the cylinder, adjustable means for regulating the position of the means operated by the energizing or de-energizing of the motor to regulate the degree of opening and closing of the valve element.

16. The combination with a conduit, a pump for pumping fluid therethrough and an electric motor for operating the pump, of a movable valve element for controlling fluid flow through the conduit, a cylinder, a piston in said cylinder and connected to said valve element for moving the valve element in opening position upon movement of the piston in one direction, a pressure operated valve structure between said pilot valve and said cylinder and acted upon by pressure in the conduit between the pump and valve element to control the flow of operating fluid to the cylinder independently of the pilot valve, a pilot valve, said pilot valve acting to permit the flow of operating fluid to and through said pressure operated valve structure and to said cylinder, said means operating said pilot valve upon de-energizing of the motor to cut off flow of pressure fluid to said pressure operated valve and permit operating fluid to bleed from said cylinder, and a weight for moving the valve element in closing position upon the bleeding of pressure fluid from the cylinder.

OSCAR H. DORER.